(12) United States Patent
Harvey et al.

(10) Patent No.: US 11,353,701 B2
(45) Date of Patent: Jun. 7, 2022

(54) MULTI-PIECE HEADS UP DISPLAY BEZEL WITH LONG CHUTE

(71) Applicant: Toyota Motor Engineering & Manufacturing North America, Inc., Plano, TX (US)

(72) Inventors: Andrew W. Harvey, South Lyon, MI (US); Jonathan Joseph Quijano, Ann Arbor, MI (US)

(73) Assignee: TOYOTA MOTOR ENGINEERING & MANUFACTURING NORTH AMERICA. INC., Plano, TX (US)

( * ) Notice: Subject to any disclaimer, the term of this patent is extended or adjusted under 35 U.S.C. 154(b) by 569 days.

(21) Appl. No.: 16/446,464

(22) Filed: Jun. 19, 2019

(65) Prior Publication Data

US 2020/0400950 A1    Dec. 24, 2020

(51) Int. Cl.
| | |
|---|---|
| *B60J 7/00* | (2006.01) |
| *G02B 27/01* | (2006.01) |
| *B60K 35/00* | (2006.01) |
| *B62D 25/14* | (2006.01) |
| *B60K 37/00* | (2006.01) |
| *B60K 37/02* | (2006.01) |
| *B60K 37/04* | (2006.01) |

(52) U.S. Cl.
CPC .......... *G02B 27/0149* (2013.01); *B60K 35/00* (2013.01); *B60K 37/00* (2013.01); *B60K 37/02* (2013.01); *B60K 37/04* (2013.01); *B62D 25/14* (2013.01); *B60K 2370/1529* (2019.05); *B60K 2370/785* (2019.05)

(58) Field of Classification Search
CPC ............ B60K 35/00; B60K 2370/1529; G02B 27/0101; G02B 2027/014; G02B 27/01; A01D 2101/00; A01D 34/63; E01H 5/098; B60H 1/00014; B60H 1/00564
See application file for complete search history.

(56) References Cited

U.S. PATENT DOCUMENTS

| | | | |
|---|---|---|---|
| 5,013,135 A * | 5/1991 | Yamamura | G02B 3/08 359/601 |
| 6,053,043 A * | 4/2000 | Dannenberg | G04B 37/144 73/431 |
| 6,100,943 A | 8/2000 | Koide et al. | |
| 7,659,868 B2 | 2/2010 | Kumon et al. | |

(Continued)

FOREIGN PATENT DOCUMENTS

| | | |
|---|---|---|
| EP | 3456572 | 3/2019 |
| JP | 2003237411 | 8/2003 |
| WO | WO2014171280 | 10/2014 |

*Primary Examiner* — Kiran B Patel
(74) *Attorney, Agent, or Firm* — Snell & Wilmer LLP (57) ABSTRACT

Systems and apparatus for a bezel assembly for a heads-up display (HUD) unit located in an instrument panel of a vehicle, the instrument panel being adjacent to a front windshield of the vehicle. The bezel assembly includes a bezel having a rear edge aligned with a front edge of the instrument panel and an interior border defining a bezel opening. The bezel assembly also includes a chute located beneath the bezel and above the HUD unit. The chute includes an exterior border defining a top chute opening aligned with the bezel opening, and an interior border defining a bottom chute opening aligned with a display screen of the HUD unit and having a shape corresponding to the display screen of the HUD unit.

20 Claims, 11 Drawing Sheets

(56) References Cited

U.S. PATENT DOCUMENTS

| | | | |
|---|---|---|---|
| 7,750,847 B2 | 7/2010 | Katayama et al. | |
| 7,952,808 B2 | 5/2011 | Hotta et al. | |
| 8,950,868 B2 | 2/2015 | Aoki et al. | |
| 9,081,179 B2 | 7/2015 | Matsuura et al. | |
| 9,519,143 B2 | 12/2016 | Takatoh et al. | |
| 10,012,837 B2 | 7/2018 | Kuwabara | |
| 10,036,941 B2 | 7/2018 | Takahashi et al. | |
| 10,118,489 B2 | 11/2018 | Sato et al. | |
| 10,222,614 B2 | 3/2019 | Kuzuhara et al. | |
| 10,234,682 B2 | 3/2019 | Yagi | |
| 2020/0018951 A1* | 1/2020 | Simpson | B60R 11/0235 |
| 2020/0298761 A1* | 9/2020 | Weindorf | B60R 1/088 |
| 2022/0043258 A1* | 2/2022 | Shin | G02B 27/0101 |

* cited by examiner

MULTI-PIECE HEADS UP DISPLAY BEZEL WITH LONG CHUTE

BACKGROUND

1. Field

This specification relates to a system and apparatus for surrounding a heads-up display (HUD) unit in a vehicle.

2. Description of the Related Art

Vehicles may include a cluster of gauges that indicate various pieces of information to the driver. These gauges may include a speedometer, an odometer, a tachometer, a temperature meter, a fuel gauge, and/or a fuel efficiency meter. Vehicles may also include an infotainment unit that provides information to the driver or other occupants of the vehicle regarding navigation directions and audio information (e.g., music, radio). Some vehicles may have a heads-up display (HUD) that projects onto the front windshield some information that the driver would normally find on the gauge cluster or the infotainment unit. In this way, the driver is able to view the information without having to take the driver's eyes off of the road. However, conventional HUDs are not well-integrated into the passenger cabin of the vehicle. Thus, there is a need for improved HUDs.

SUMMARY

What is described is a bezel assembly for a heads-up display (HUD) unit located in an instrument panel of a vehicle, the instrument panel being adjacent to a front windshield of the vehicle. The bezel assembly includes a bezel having a rear edge aligned with a front edge of the instrument panel and an interior border defining a bezel opening. The bezel assembly also includes a chute located beneath the bezel and above the HUD unit. The chute includes an exterior border defining a top chute opening aligned with the bezel opening, and an interior border defining a bottom chute opening aligned with a display screen of the HUD unit and having a shape corresponding to the display screen of the HUD unit.

Also described is a vehicle having a front windshield, an instrument panel adjacent to the front windshield, and a heads-up display (HUD) unit located in the instrument panel. The vehicle also includes a bezel having a rear edge aligned with a front edge of the instrument panel and an interior border defining a bezel opening. The vehicle also includes a chute located beneath the bezel and above the HUD unit. The chute includes an exterior border defining a top chute opening aligned with the bezel opening, and an interior border defining a bottom chute opening aligned with a display screen of the HUD unit and having a shape corresponding to the display screen of the HUD unit.

Also described is a chute of a bezel assembly for a heads-up display (HUD) unit located in an instrument panel of a vehicle, the instrument panel being adjacent to a front windshield of the vehicle. The chute includes an exterior border defining a top chute opening aligned with a bezel opening. The chute also includes an interior border defining a bottom chute opening aligned with a display screen of the HUD unit and having a shape corresponding to the display screen of the HUD unit, the bottom chute opening being lower in depth than the top chute opening, and the bottom chute opening being smaller in area than the top chute opening, the interior border of the chute having a rear edge having a shape corresponding to a shape of the front windshield, and the rear edge of the interior border of the chute being angled relative to a rear edge of the bezel.

BRIEF DESCRIPTION OF THE DRAWINGS

Other systems, methods, apparatus, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems and apparatus for surrounding a heads-up display (HUD) unit on an instrument panel of a vehicle. Conventional HUD units project an image against the windshield. Accordingly, the HUD unit follows the angle of the glass in order to reflect the HUD image correctly. The angle of the HUD unit is not square with the driver where the HUD angle matches the curvature of the windshield. Drivers desire uniformity and orientation from the direction and perception of the driver. Conventional HUD units only have thin bezels surrounding the HUD units, and these conventional thin bezels have the same angled shape and orientation as the HUD units. The angled HUD unit and conventional bezels create an awkward, non-uniform appearance as though the HUD unit has been rotated out of balance with the rest of the interior cabin design.

Disclosed herein are a bezel and a chute for surrounding the HUD unit and incorporating the HUD unit into the instrument panel of the vehicle. The bezel and chute give a uniform aesthetic illusion by moving the angled HUD cutout away from the viewing angle of the driver by moving the HUD unit cutout deeper below the instrument panel surface while providing a bezel at the top of the instrument panel surface to create a further obstruction. Because the HUD unit is at a depth below the bezel, a chute is used to close the gap between the bezel and the HUD unit.

The HUD unit and the bezel described herein are not square with respect to each other. Accordingly, the chute operates as a transitioning surface from one orientation rotated to match the other orientation. Design of this transitioning surface creates the illusion of uniformity between driver orientation and HUD unit when there is none.

Figure 1A:
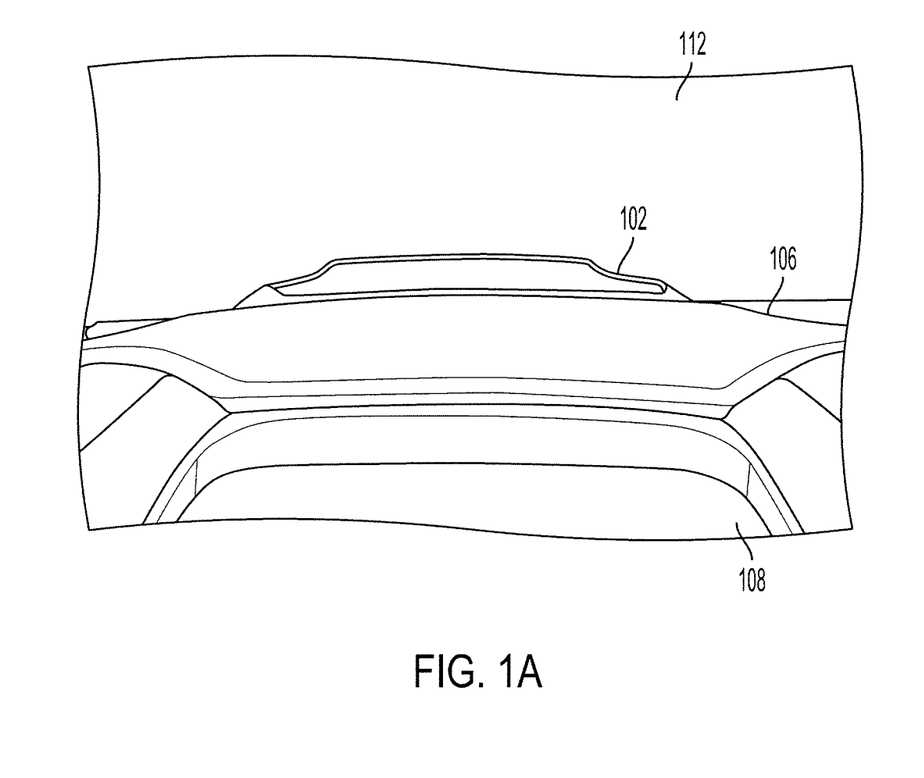
FIGS. 1A-1C illustrate a vehicle having a heads-up display (HUD), according to various embodiments of the invention.

FIG. 1A illustrates a view from the driver's perspective. The driver views a meter cluster 108 containing one or more meters, including a speedometer, a tachometer, a fuel meter, or a fuel efficiency meter. Above the meter cluster 108 is instrument panel 106. As used herein, "instrument panel" refers to the generally horizontal structure above the meter cluster 108 and separate from the meter cluster 108. The instrument panel 106 covers the interior components of the meter cluster 108 and other components of the vehicle. The instrument panel 106 is adjacent to the front windshield 112. Attached to the instrument panel 106 is a bezel 102. The bezel 102 surrounds the heads-up display (HUD) unit. The bezel 102 is configured to surround an opening in the instrument panel 106. In some embodiments, the bezel 102 lies on top of the instrument panel 106.

Figure 1B:
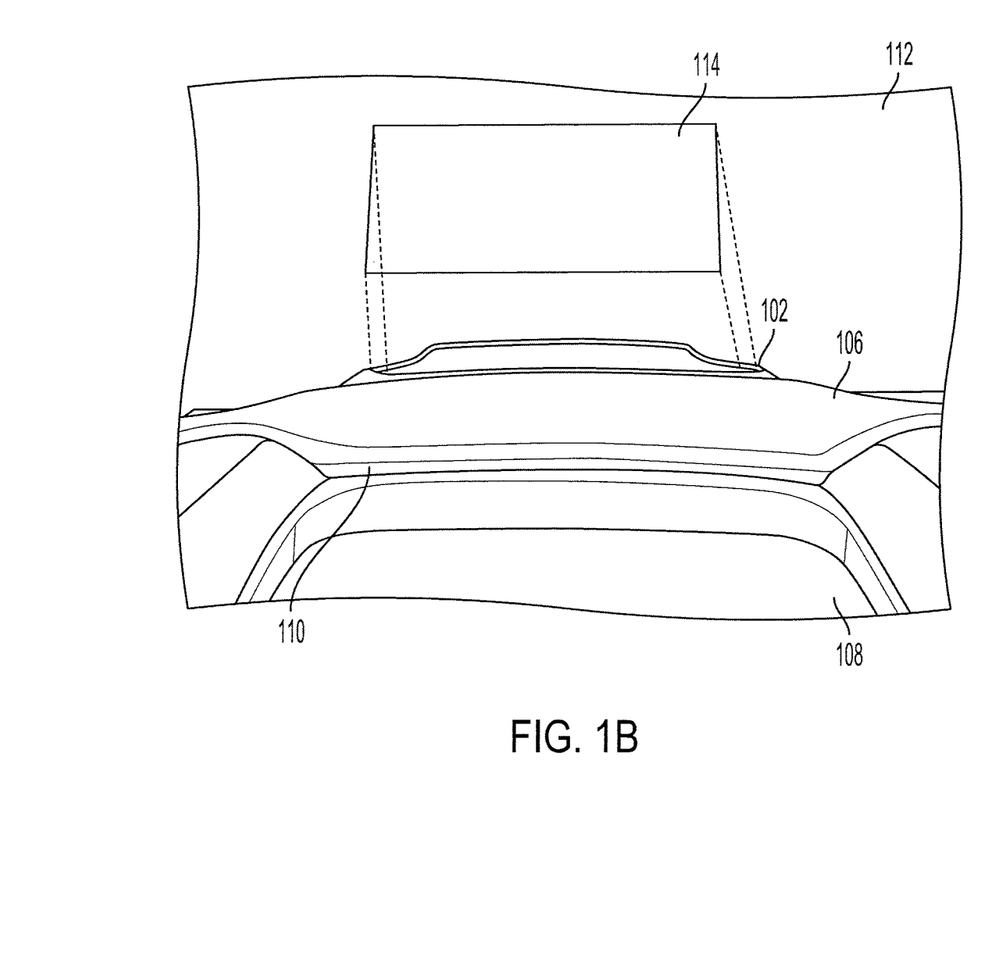

FIG. 1B illustrates the HUD unit projecting a HUD image 114 onto the front windshield 112. The HUD image 114 may include any information that may be useful to the driver, including navigation directions, speed limit, or remaining fuel, for example. The HUD image 114 allows the driver to not have to look down at the meter cluster 108 or the infotainment unit (not pictured) conventionally to the right of the driver. The HUD unit may be located below the plane of the instrument panel 106, as will be shown in further detail herein.

In some embodiments, the instrument panel 106 may extend substantially the entire width of the passenger cabin in front of the front two passengers, along the front windshield 112. This may otherwise be referred to as a "dashboard." In some embodiments, the instrument panel 106 is one piece of a plurality of pieces that cover the width of the passenger cabin in front of the front two passengers, along the front windshield 112.

The instrument panel 106 may have a front edge 110 having an instrument panel shape. The instrument panel shape may refer to the shape of the instrument panel 106 in front of the driver (and above the meter cluster 108) or may refer to the shape of the instrument panel 106 that extends the width of the passenger cabin in front of the front passengers and along the front windshield 112. The instrument panel shape varies across vehicles based on the aesthetic and design of the various vehicles, but generally the instrument panel shape is flatter than the curve of the front windshield 112. That is, when viewing a vehicle from a top-down view, the front windshield 112 has a generally curved shape, but the instrument panel 106 in many vehicles has a generally flat shape established by the front edge 110 of the instrument panel 106. The generally flat shape of the instrument panel 106 may span the width of the passenger cabin of the vehicle.

In order for the HUD unit to project the HUD image 114 onto the front windshield 112, the HUD unit has a shape and orientation corresponding to the shape of the front windshield 112. Conventional bezels surrounding conventional HUD units are angled with respect to the front edge 110 of the instrument panel 106 in order to accommodate the angled orientation of conventional HUD units. This creates a visually imbalanced and unpleasant layout, as the conventional bezels are inconsistent with the shape of the instrument panel 106.

The bezel 102 is unlike conventional bezels in that the bezel 102 is consistent with the shape of the instrument panel 106. That is, the bezel 102 is aligned with the front edge 110 of the instrument panel 106. This creates a more visually pleasing look, as well as more clearly indicating to the driver and any other occupants where the HUD unit is located. By making the HUD unit location a more prominent part of the layout of the passenger cabin, the driver and any other occupants may more easily identify where the HUD image 114 is coming from. In some situations, by reducing uncertainty about the components of the passenger cabin, safety may be increased, as the driver or any other occupants may be less distracted.

Figure 1C:
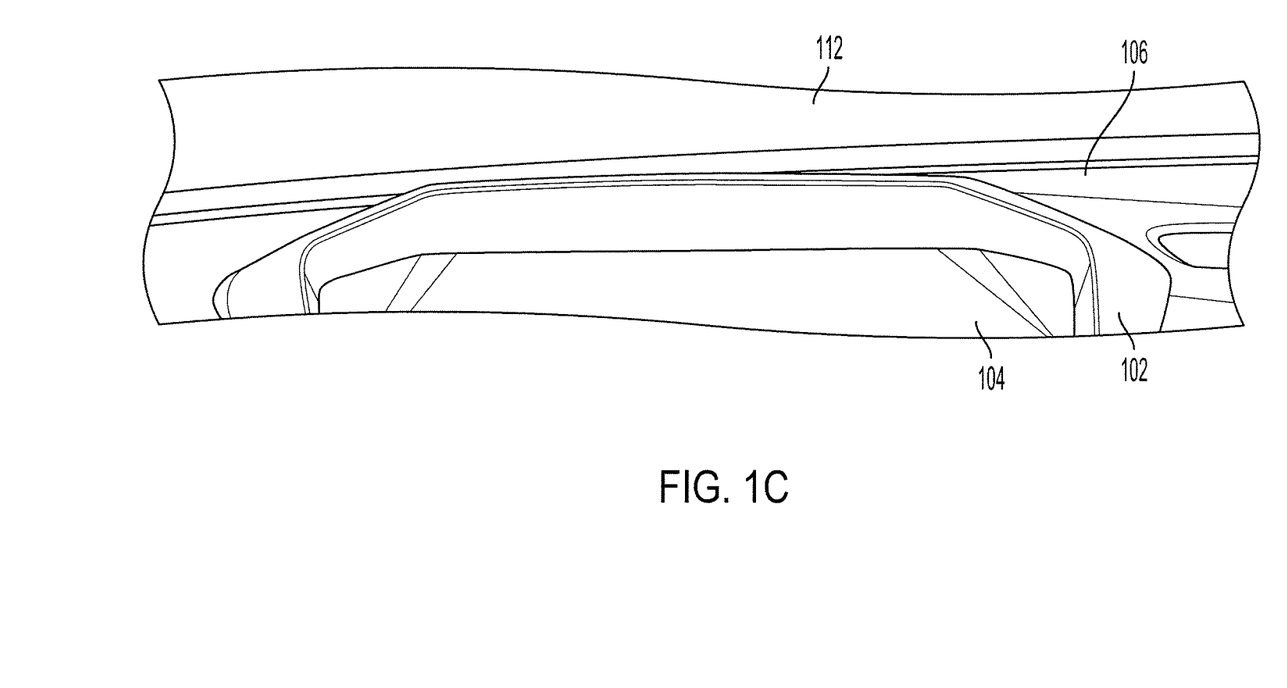

FIG. 1C illustrates a view from the driver's perspective of the bezel 102, the chute 104 located beneath the bezel 102, the instrument panel 106, and the front windshield 112. The chute 104 has a shape that gives the appearance of uniformity of the visible portions of the chute 104, as shown in FIG. 1C. The visible portions of the chute 104 are visually consistent with the appearance of the bezel 102 from the driver's point of view.

The transition surface of the chute 104 appears to be sloped in the same orientation along the visible surface. However, the left and right sides of the visible corners on the chute 104 are angled in completely opposite directions. The bezel 102 and the chute 104 may be made from any rigid material, such as a plastic. The bezel 102 and the chute 104 may individually attach to the instrument panel 106 using connectors (e.g., clips), an adhesive, or using interference fit.

Figure 2:
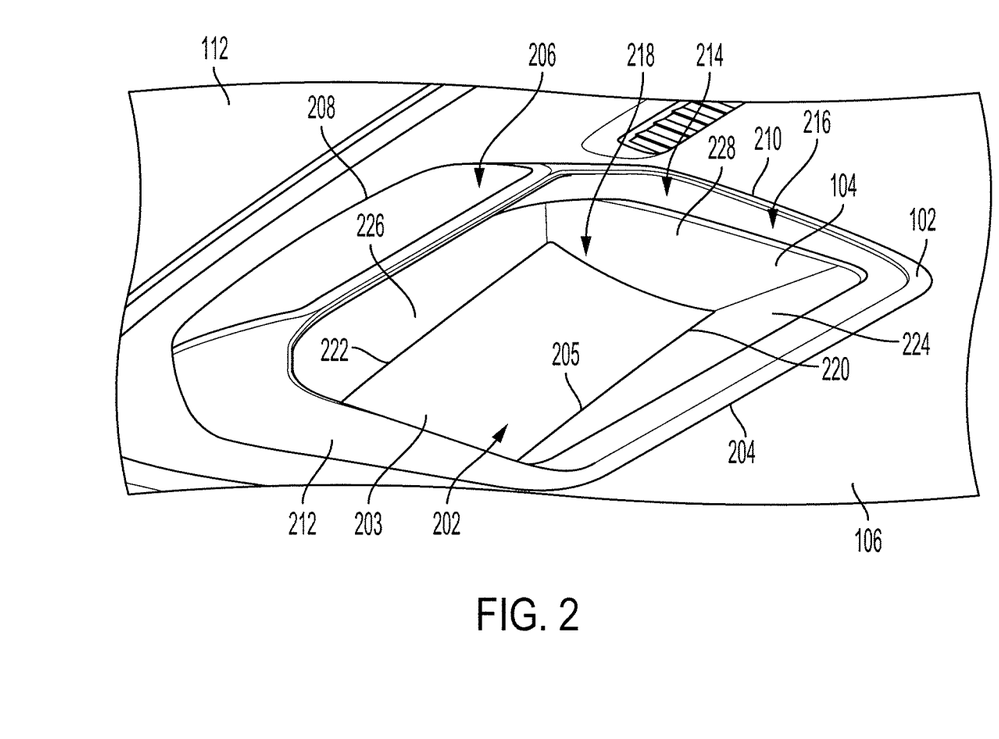
FIG. 2 illustrates an elevated perspective view of a HUD bezel and chute, according to various embodiments of the invention.

FIG. 2 illustrates an elevated perspective view of the instrument panel and the HUD unit.

As described herein, the instrument panel 106 has an opening where the HUD unit 202 is located. A bezel 102 and a chute 104 also occupy this opening along with the HUD unit 202. The HUD unit 202 is located below the plane established by the instrument panel 106 and is angled toward the front windshield 112 so that the HUD image can be projected onto the front windshield 112, as illustrated in FIG. 1B.

The bezel 102 has a shape that extends upward above the plane established by the instrument panel 106. The chute 104 is an intermediate structure that bridges the gap between the HUD unit 202 and the bezel 102.

The bezel 102 has a rear edge 204, a right edge 210, a left edge 212, and a front edge 208. The front edge 208 is proximal to the front windshield 112 and has a shape that corresponds to the shape of the front windshield 112. The rear edge 204 is closer to the driver than the front edge 208 is, and the rear edge 204 has a shape that corresponds to the shape of the instrument panel 106. In some embodiments, the rear edge 204 has a shape that corresponds to the front edge 110 of the instrument panel 106.

The bezel 102 also has an overhang 206 that prevents light entering into the vehicle from the front windshield 112 from interfering with the projection of the HUD image by the HUD unit 202 onto the front windshield 112. The overhang 206 also prevents light from reflecting off of the HUD unit 202. This reflected light may be projected into the eyes of the driver or a passenger of the vehicle. The HUD unit 202 projects the HUD image over the overhang 206 and toward and onto the front windshield 112.

The bezel 102 has an interior border 214 that defines a bezel opening. The chute 104 has an exterior border 216 that defines a top chute opening. In some embodiments, the top chute opening defined by the exterior border 216 of the chute 104 is coplanar with the instrument panel 106, and the bezel 102 is located entirely on top of the plane of the instrument panel 106. The bezel opening and the top chute opening may have the same shape, such that there is no gap between the bezel opening and the top chute opening. That is, when the interior border 214 of the bezel and the exterior border 216 of the chute 104 are aligned, there is no gap between the bezel 102 and the chute 104.

The chute 104 has an interior border 218 that defines a bottom chute opening. The bottom chute opening is lower than the top chute opening. That is, the bottom chute opening is located farther away from the instrument panel 106 than the top chute opening. The bottom chute opening is also smaller in area than the top chute opening.

The HUD unit 202 has a display screen 203 with a screen border 205. The screen border 205 and the bottom chute opening may have the same shape such that there is no gap between the screen border 205 and the bottom chute opening. That is, when the screen border 205 and the interior border 218 of the chute 104 are aligned, there may be no gap between the display screen 203 and the chute 104.

The interior border 218 of the chute 104 has a rear edge 220. Due to the different angles of the front windshield 112 and the front edge 110 of the instrument panel 106, the rear edge 220 of the interior border 218 of the chute forms an angle with the rear edge 204 of the bezel 102. In some embodiments, this angle between the rear edge 204 of the bezel 102 and the rear edge 220 of the interior border 218 of the chute 104 is an approximately 45-degree angle.

The interior border 218 of the chute 104 has a front edge 222. Due to the different angles of the front windshield 112 and the front edge 110 of the instrument panel 106, the front edge 222 of the interior border 218 of the chute forms an angle with the rear edge 204 of the bezel 102. In some embodiments, this angle between the rear edge 204 of the bezel 102 and the front edge 222 of the interior border 218 of the chute 104 is an approximately 45-degree angle.

Figure 3:
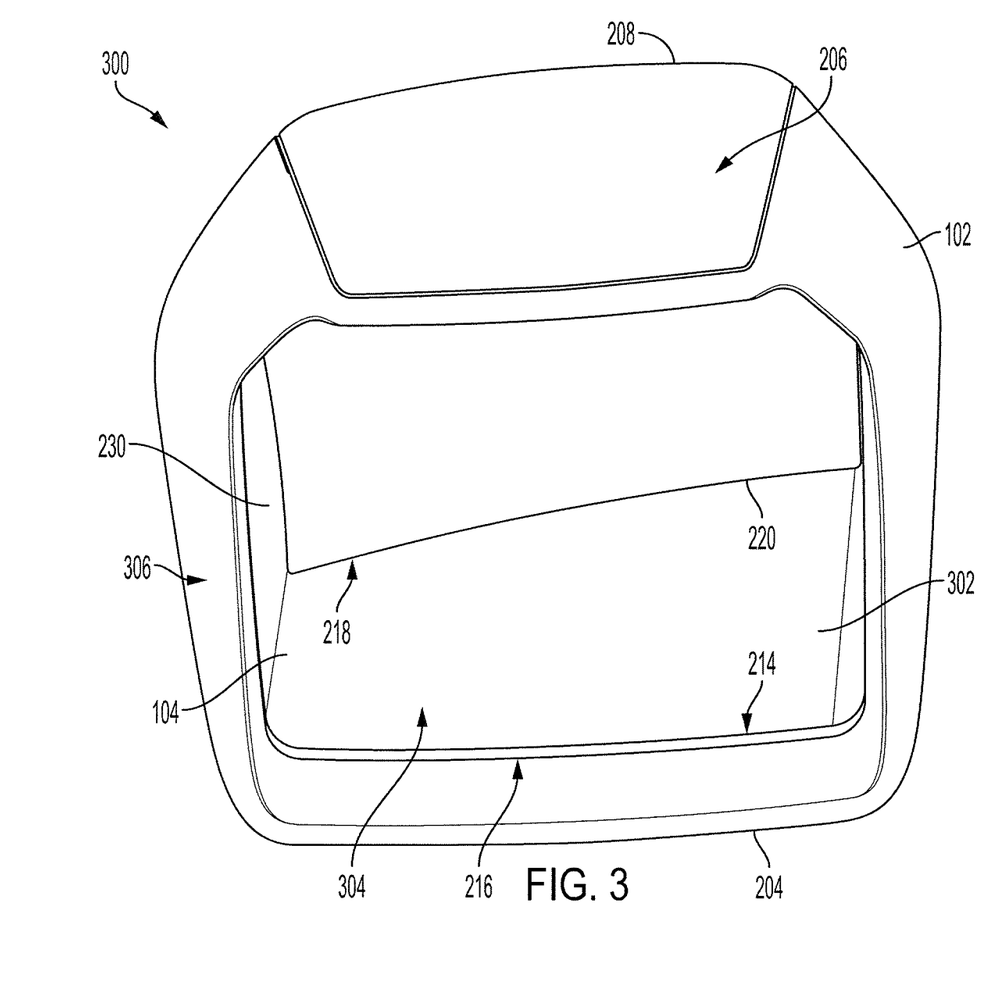
FIG. 3 illustrates a top-down view of a HUD bezel and chute, according to various embodiments of the invention.

The chute 104 has a rear sloped surface 224, a front sloped surface 226, a right sloped surface 228, and a left sloped surface 230 (shown in FIG. 3). The rear sloped surface 224, the front sloped surface 226, the right sloped surface 228, and the left sloped surface 230 allow the chute 104 to transition from the shape established by the interior border 214 of the bezel 102 to the shape established by the display screen 203 of the HUD unit 202. The rear sloped surface 224 has a shallower slope than the front sloped surface 226. The left sloped surface 230 and the right sloped surface 228 have approximately equal slopes and may be substantially vertical. The front sloped surface 226 may have a bottom left corner that is lower in depth than a bottom right corner, as will be shown in further detail in FIG. 5. The rear sloped surface 224 may be longer than the front sloped surface 226.

FIG. 3 illustrates a top-down view of the bezel 102 and the chute 104. In some embodiments, the bezel 102 and the chute 104 may be collectively referred to as the HUD bezel assembly 300. The top surface 306 of the bezel 102 and the top surface 304 of the chute 104 are shown.

The bezel 102 has a rear edge 204 that is closer to the driver than the front edge 208. The front edge 208 of the bezel 102 is closer to the front windshield than the rear edge 204 is. The front edge 208 has a curved shape corresponding to the curved shape of the front windshield. The rear edge 204 has a flat shape corresponding to the shape of the instrument panel. The rear edge 220 of the interior border 218 of the chute 104 also has a curved shape corresponding to the curved shape of the front windshield. Accordingly, the rear edge 220 of the interior border 218 of the chute 104 is angled with respect to the rear edge 204 of the bezel 102.

Also shown is the overhang 206 adjacent to the front edge 208 of the bezel 102. The overhang 206 protects the projection of the HUD image from the HUD unit from interference from light entering the vehicle from the front windshield.

As described herein, the bezel 102 has an interior border 214 that defines a bezel opening. The chute 104 has an exterior border 216 that defines a top chute opening. The bezel opening and the top chute opening may have the same shape, such that there is no gap between the bezel opening and the top chute opening. That is, when the interior border 214 of the bezel and the exterior border 216 of the chute 104 are aligned, there is no gap between the bezel 102 and the chute 104.

Also as described herein, the chute 104 has an interior border 218 that defines a bottom chute opening. The bottom chute opening is lower than the top chute opening. That is, the bottom chute opening is located farther away from the instrument panel 106 than the top chute opening. The interior border 218 has a rear edge 220.

The chute 104 also has a rear sloped surface 224 that connects the rear edge 220 of the interior border 218 of the chute 104 to a corresponding portion of the interior border 214 of the bezel 102. The rear sloped surface 224 covers the interior cavity of the vehicle in front of the driver. If an object, such as a pen or a piece of paper were to be placed on the rear sloped surface 224, the object would not fall into the interior cavity of the vehicle. If the object fell into the interior cavity of the vehicle, the object may interfere with vehicle components, potentially causing a malfunctioning of the vehicle.

Figure 4:
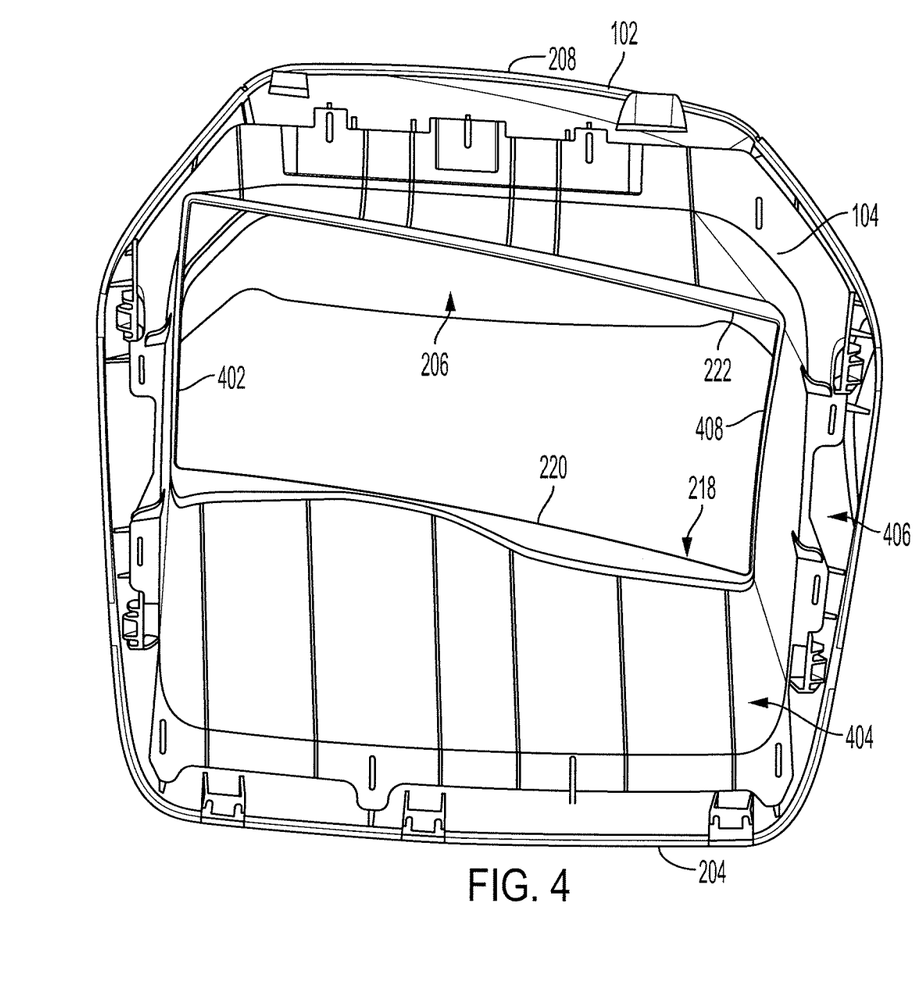
FIG. 4 illustrates a bottom-up view of a HUD bezel and chute, according to various embodiments of the invention.

FIG. 4 illustrates a bottom view of the chute 104 and the bezel 102. The bottom view is a view from the interior cavity of the vehicle in front of the driver. Shown are the bottom surface 404 of the chute 104 and the bottom surface 406 of the bezel 102.

Also shown are the front edge 208 of the bezel 102, the rear edge 204 of the bezel 102, and the overhang 206 of the bezel 102, each as described herein.

The interior border 218 of the chute 104, which defines a bottom chute opening, has a rear edge 220, a front edge 222, a left side edge 408, and a right side edge 402. The rear edge 220 and the front edge 222 are angled with respect to the rear edge 204 of the bezel 102 due to the HUD unit having a shape corresponding to the shape of the front windshield. The left side edge 408 is also angled with respect to the right side edge 402. The right side edge 402 is substantially perpendicular with the bottom edge 204 of the bezel 102. In some embodiments, the shape of the interior border 218 may be different based on the location of the HUD unit in the vehicle and the shape of the front windshield.

The chute 104, from corner to corner (underneath the bezel 102 down to the HUD unit), the inner surface at the top left corner travels upward while the top right corner travels downward (i.e., from the bezel 102 to HUD cutout). The chute 104 provides unique curves and angular surface taken from the perspective of the driver so that both of the visible corner areas (shown in FIG. 1C) appear uniform (e.g., similar length, slope, and direction), when in fact this is an illusion. The differing depth/lengths of the inner corners are drastically apparent, the slopes have almost a 45 degree variation, and the visible corners slope in opposite directions. Yet the appearance appears substantially uniform to the driver due to the specially crafted chute 104 and bezel 102 described herein.

Figure 5:
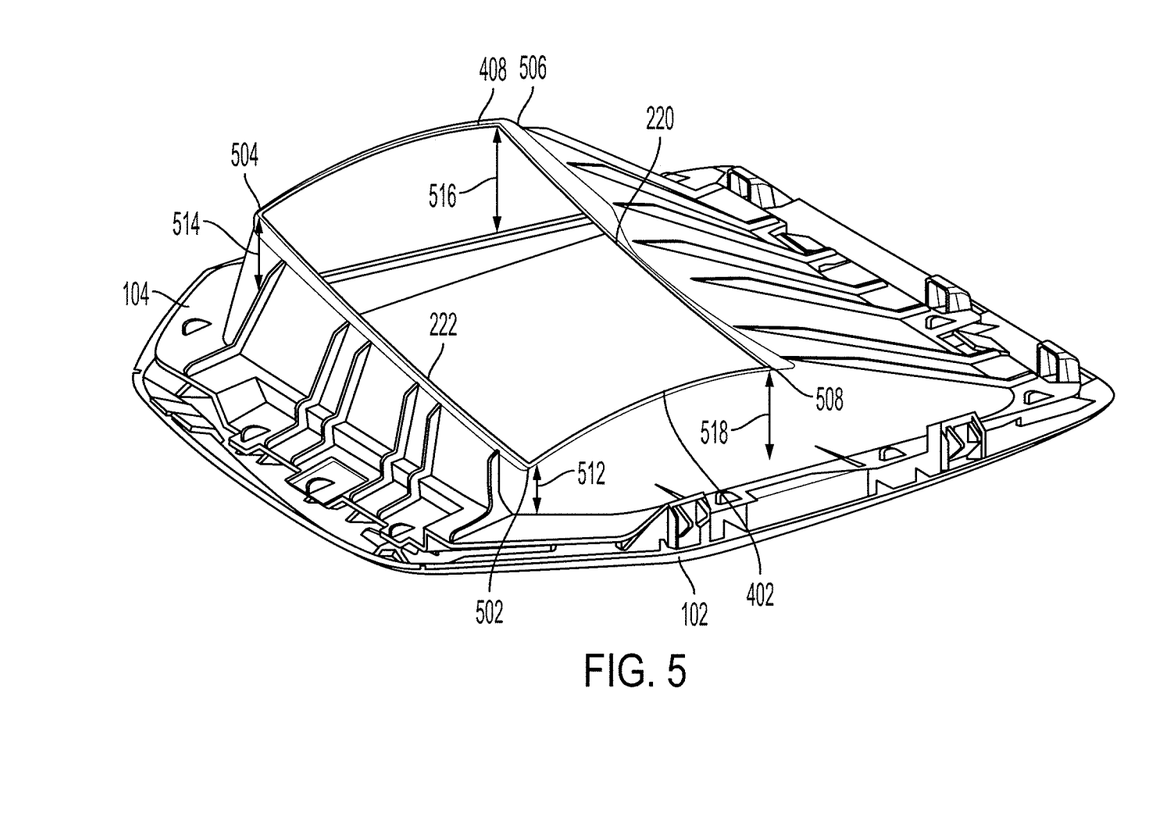
FIG. 5 illustrates a perspective view of the bottom of the HUD bezel and chute, according to various embodiments of the invention.

FIG. 5 is a bottom perspective view of the chute 104 and the bezel 102. Shown are the front edge 222, rear edge 220, the left side edge 408, and the right side edge 402 of the interior border 218 of the chute 104, as described herein.

Also shown are a left-front corner 502 located where the right side edge 402 and the front edge 222 meet, a right-front corner 504 located where the left side edge 408 and the front edge 222 meet, a right-rear corner 506 located where the rear edge 220 and the left side edge 408 meet, and a left-rear corner 508 located where the right side edge 402 and the rear edge 220 meet.

The left-front corner 502 has a left-front height 512, the right-front corner 504 has a right-front height 514, the right-rear corner 506 has a right-rear height 516, and the left-rear corner 508 has a left-rear height 518. The respective heights refer to the distance between the respective corners and the plane established by the exterior border 216 of the chute 104.

The left-front height 512 may be shorter than the left-rear height 518. The left-rear height 518 may be shorter than the right-front height 514. The left-front height 512 may also be shorter than the right-front height 514. The left-front height 512 may be shorter than the right-rear height 516. The right-front height 514 may be shorter than the right-rear height 516. The left-rear height 518 may be shorter than the right-rear height 516. The various heights 512-518 of the respective corners 502-508 establish an angled and twisted orientation of the display screen of the HUD unit.

In some embodiments, the respective heights of the respective corners may vary based on the location of the HUD unit in the vehicle and the shape of the front windshield.

Figure 6:
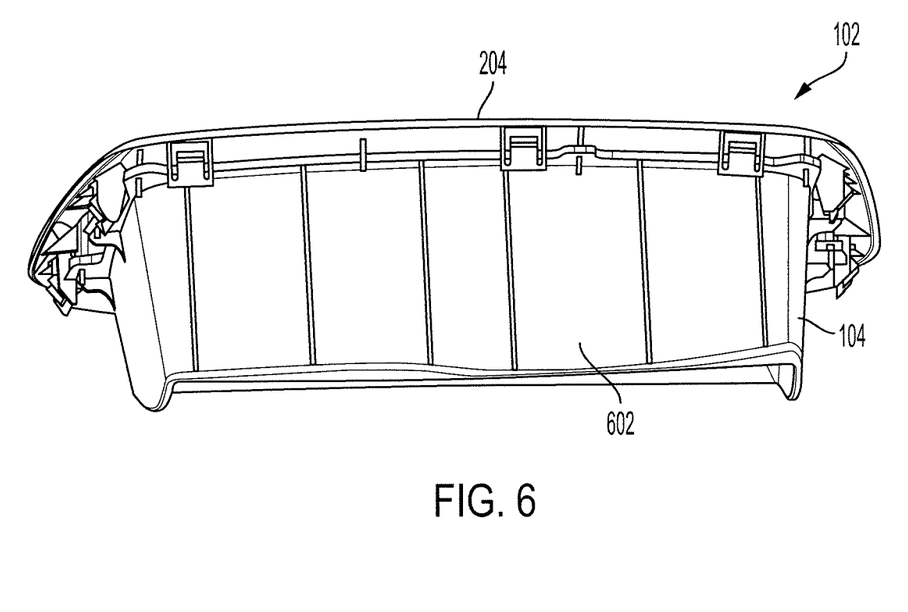
FIG. 6 illustrates a rear view of a HUD bezel and chute, according to various embodiments of the invention.

FIG. 6 illustrates a rear view of the chute 104 and the bezel 102. The rear view is that of the driver's point of view if the instrument panel and any intervening components in the vehicle were transparent.

The rear edge 204 of the bezel 102 is shown. The bottom sloped surface 602 of the chute 104 is the bottom side of the rear sloped surface 224 shown in FIGS. 2 and 3.

Figure 7:
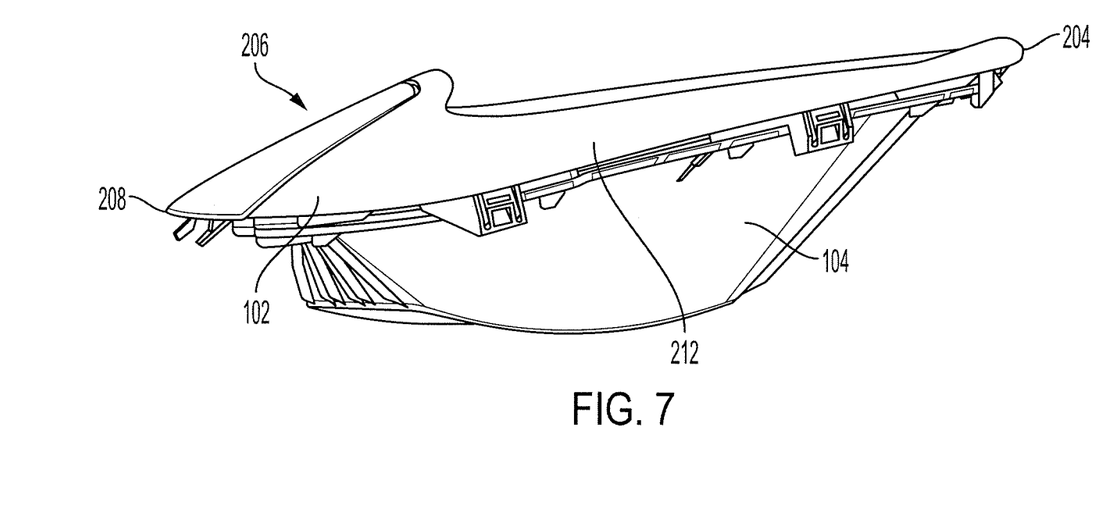
FIG. 7 illustrates a left side view of a HUD bezel and chute, according to various embodiments of the invention.

FIG. 7 illustrates a left side view of the chute 104 and the bezel 102. The chute 104 and the bezel 102 are angled in a forward direction toward the front windshield so that the HUD image from the HUD unit may be projected over the overhang 206 and onto the front windshield. Also illustrated are the left edge 212 of the bezel 102, the front edge 208 of the bezel 102, and the rear edge 204 of the bezel 102. The rear edge 204 of the bezel 102 may have a height higher than the front edge 208 of the bezel 102. The rear edge 204 of the bezel 102 may have a height at or higher than the overhang 206. The bottom surface of the chute shown in FIG. 7 corresponds to the bottom side of the left sloped surface 230 shown in FIG. 3.

Figure 8:
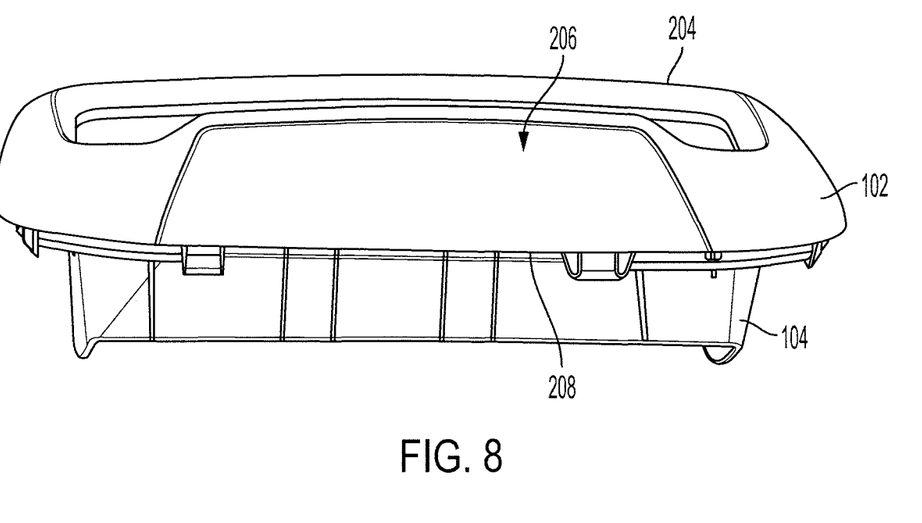
FIG. 8 illustrates a front view of a HUD bezel and chute, according to various embodiments of the invention.

FIG. 8 illustrates a front view of the chute 104 and the bezel 102. The front view is from the perspective of outside the vehicle facing inward and toward the driver. Shown are the overhang 206 and the rear edge 204 of the bezel 102. As also shown in FIG. 7, the rear edge 204 of the bezel 102 may have a height at or higher than the overhang 206, and the rear edge 204 may have a height higher than the front edge 208 of the bezel 102. The bottom surface of the chute 104 shown in FIG. 8 corresponds to the bottom side of the front sloped surface 226 shown in FIG. 2.

Figure 9:
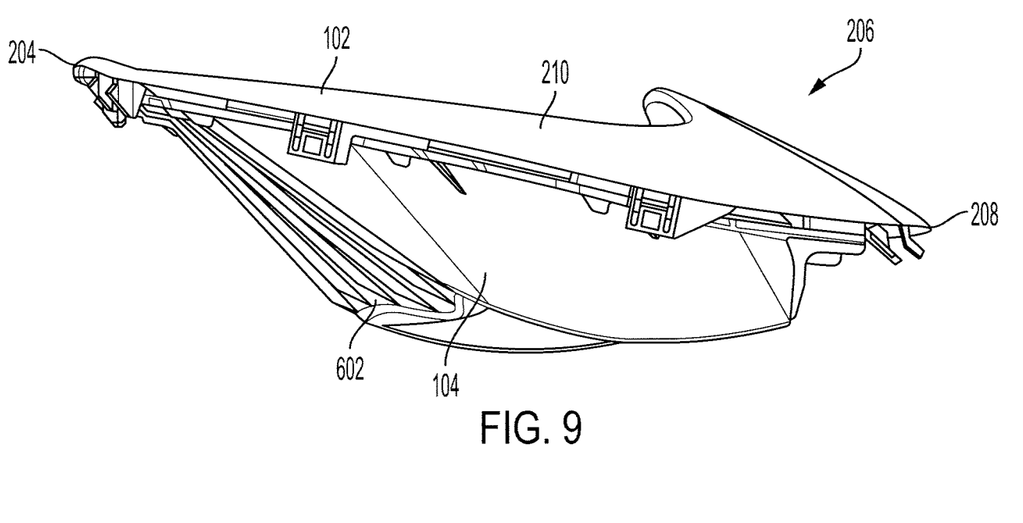
FIG. 9 illustrates a right side view of a HUD bezel and chute, according to various embodiments of the invention.

FIG. 9 illustrates a right side view of the chute 104 and the bezel 102. The chute 104 and the bezel 102 are angled in a forward direction toward the front windshield so that the HUD image from the HUD unit may be projected over the overhang 206 and onto the front windshield. Also illustrated are the right edge 210 of the bezel 102, the front edge 208 of the bezel 102, and the rear edge 204 of the bezel 102. The rear edge 204 of the bezel 102 may have a height higher than the front edge 208 of the bezel 102. The rear edge 204 of the bezel 102 may have a height at or higher than the overhang 206. The bottom surface of the chute shown in FIG. 9 corresponds to the bottom side of the right sloped surface 228 shown in FIG. 2.

Also visible is the bottom sloped surface 602 of the chute 104 which corresponds to the rear sloped surface 224 of FIGS. 2 and 3. The visibility of the bottom sloped surface 602 illustrates the rear sloped surface 224 being sloped downward from the right side of the chute 104 toward the left side of the chute 104. That is, the left side of the rear sloped surface 224 is lower than the right side of the rear sloped surface 224.

The systems and devices shown herein are illustrated with respect to a vehicle which has a driver located in the front left seat of the vehicle. However, the systems and devices described herein may be adjusted to accommodate vehicles which have the driver located in the front right seat of the vehicle. In these vehicles, a mirror image of the systems and devices illustrated herein may be used.

The systems and devices described herein may be used in any conveyance, such as a vehicle with an internal combustion engine, a vehicle with a motor powered by a battery, a hybrid vehicle having both an engine and a motor, a fully autonomous vehicle, a semi-autonomous vehicle, or a human-driven vehicle, for example.

As used herein, approximately or substantially may be used with a plus or minus 10% margin. For example, a measurement that is approximately 5 feet may be between 4.5 feet and 5.5 feet.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A bezel assembly for a heads-up display (HUD) unit located in an instrument panel of a vehicle, the instrument panel adjacent to a front windshield of the vehicle, the bezel assembly comprising:
   a bezel having a rear edge aligned with a front edge of the instrument panel and an interior border defining a bezel opening; and
   a chute located beneath the bezel and above the HUD unit, the chute having:
      an exterior border defining a top chute opening aligned with the bezel opening, and
      an interior border defining a bottom chute opening aligned with a display screen of the HUD unit and having a shape corresponding to the display screen of the HUD unit.

2. The bezel assembly of claim 1, wherein the bottom chute opening is lower in depth than the top chute opening, and
   wherein the bottom chute opening is smaller in area than the top chute opening.

3. The bezel assembly of claim 1, wherein the interior border of the chute has a rear edge having a shape corresponding to a shape of the front windshield, and
   wherein the rear edge of the interior border of the chute is angled relative to the rear edge of the bezel.

4. The bezel assembly of claim 1, wherein the chute further includes a front sloped surface, a rear sloped surface, a left sloped surface, and a right sloped surface, the rear sloped surface being longer and having a shallower slope than the front sloped surface.

5. The bezel assembly of claim 1, wherein the bezel further includes an overhang located proximal to a front edge of the bezel opposite the rear edge of the bezel, the overhang configured to prevent light entering the vehicle from the front windshield from reflecting off of the display screen of the HUD unit and into a driver's eyes.

6. The bezel assembly of claim 1, wherein the exterior border of the chute defining the top chute opening lies along a plane established by the instrument panel.

7. The bezel assembly of claim 1, wherein the interior border of the chute has a front edge, a rear edge, a left side edge, and a right side edge, the right side edge and the front edge meeting at a left-front corner having a left-front height, the left side edge and the front edge meeting at a right-front corner having a right-front height, the rear edge and the left side edge meeting at a right-rear corner having a right-rear height, and the right side edge and the rear edge meeting at a left-rear corner having a left-rear height, and
wherein left-front height is shorter than the right-rear height.

8. The bezel assembly of claim 7, wherein the left-front height is shorter than the left-rear height and the right-front height is shorter than the right-rear height.

9. The bezel assembly of claim 8, wherein the left-front height is shorter than the right-front height and the left-rear height is shorter than the right-rear height.

10. A vehicle comprising:
a front windshield;
an instrument panel adjacent to the front windshield;
a heads-up display (HUD) unit located in the instrument panel;
a bezel having a rear edge aligned with a front edge of the instrument panel and an interior border defining a bezel opening; and
a chute located beneath the bezel and above the HUD unit, the chute having:
an exterior border defining a top chute opening aligned with the bezel opening, and
an interior border defining a bottom chute opening aligned with a display screen of the HUD unit and having a shape corresponding to the display screen of the HUD unit.

11. The vehicle of claim 10, wherein the bottom chute opening is lower in depth than the top chute opening, and
wherein the bottom chute opening is smaller in area than the top chute opening.

12. The vehicle of claim 10, wherein the interior border of the chute has a rear edge having a shape corresponding to a shape of the front windshield, and
wherein the rear edge of the interior border of the chute is angled relative to the rear edge of the bezel.

13. The vehicle of claim 10, wherein the chute further includes a front sloped surface, a rear sloped surface, a left sloped surface, and a right sloped surface, the rear sloped surface being longer and having a shallower slope than the front sloped surface.

14. The vehicle of claim 10, wherein the bezel further includes an overhang located proximal to a front edge of the bezel opposite the rear edge of the bezel, the overhang configured to prevent light entering the vehicle from the front windshield from reflecting off of the display screen of the HUD unit and into a driver's eyes.

15. The vehicle of claim 10, wherein the exterior border of the chute defining the top chute opening lies along a plane established by the instrument panel.

16. The vehicle of claim 10, wherein the interior border of the chute has a front edge, a rear edge, a left side edge, and a right side edge, the right side edge and the front edge meeting at a left-front corner having a left-front height, the left side edge and the front edge meeting at a right-front corner having a right-front height, the rear edge and the left side edge meeting at a right-rear corner having a right-rear height, and the right side edge and the rear edge meeting at a left-rear corner having a left-rear height, and
wherein left-front height is shorter than the right-rear height.

17. The vehicle of claim 16, wherein the left-front height is shorter than the left-rear height and the right-front height is shorter than the right-rear height.

18. The vehicle of claim 17, wherein the left-front height is shorter than the right-front height and the left-rear height is shorter than the right-rear height.

19. A chute of a bezel assembly for a heads-up display (HUD) unit located in an instrument panel of a vehicle, the instrument panel adjacent to a front windshield of the vehicle, the chute comprising:
an exterior border defining a top chute opening aligned with a bezel opening; and
an interior border defining a bottom chute opening aligned with a display screen of the HUD unit and having a shape corresponding to the display screen of the HUD unit, the bottom chute opening being lower in depth than the top chute opening, and the bottom chute opening being smaller in area than the top chute opening, the interior border of the chute having a rear edge having a shape corresponding to a shape of the front windshield, and the rear edge of the interior border of the chute being angled relative to a rear edge of the bezel.

20. The chute of claim 19, wherein the interior border has a front edge, a rear edge, a left side edge, and a right side edge, the right side edge and the front edge meeting at a left-front corner having a left-front height, the left side edge and the front edge meeting at a right-front corner having a right-front height, the rear edge and the left side edge meeting at a right-rear corner having a right-rear height, and the right side edge and the rear edge meeting at a left-rear corner having a left-rear height, and
wherein left-front height is shorter than the right-rear height, the left-front height is shorter than the left-rear height, the right-front height is shorter than the right-rear height, the left-front height is shorter than the right-front height, and the left-rear height is shorter than the right-rear height.

* * * * *